United States Patent

[11] 3,625,583

[72] Inventors George J. Fan
San Jose, Calif.;
James H. Greiner, Millwood, N.Y.

[21] Appl. No. 745,034
[22] Filed July 15, 1968
[45] Patented Dec. 7, 1971
[73] Assignee International Business Machines Corporation
Armonk, N.Y.

[54] ERASABLE HOLOGRAM
3 Claims, 6 Drawing Figs.

[52] U.S. Cl. .................................................... 350/3.5, 340/174 TF, 340/174 YC, 350/151, 350/162 R
[51] Int. Cl. .................................................... G02b 27/00, G02f 1/22
[50] Field of Search .......................................... 350/3.5; 346/74; 340/174

[56] References Cited

UNITED STATES PATENTS

| | | | |
|---|---|---|---|
| 3,368,209 | 2/1968 | McGlauchlin et al. ....... | 340/174 |
| 3,491,343 | 1/1970 | Cook .......................... | 350/3.5 UX |

OTHER REFERENCES

I. Freiser et al., " Magnetic Recording with Laser Beams" IBM Technical Disclosure Bulletin, Vol. 8, No. 2, July 1965, pp. 291, 292. 350- 321 (OSR).

Vitols, " Hologram Memory For Storing Digital Data" IBM Technical Disclosure Bulletin Vol. 8, No. 11, Apr. 1966 pp. 1,581- 1,583.

*Primary Examiner*—John K. Corbin
*Attorneys*—Hanifin and Jancin and George Baron

ABSTRACT: A hologram is produced that is erasable. The erasable storage medium is a thin layer of a europium chalcogenide, i.e., europium oxide, on which the hologram is recorded. The medium chosen on which to record a hologram is erasable and shows no degradation for repetitive storage and erasures. A powerful laser beam is employed for recording purposes in that short powerful light pulses are needed to record on materials having short thermorelaxation times.

INVENTORS
GEORGE J. FAN
JAMES H. GREINER

BY [signature]
ATTORNEY

ERASABLE HOLOGRAM

CROSS-REFERENCES OF RELATED APPLICATIONS

An application entitled "Magnetic Recording" by George J. Fan filed July 7, 1966, Ser. No. 563,553, now abandoned, covers an invention dealing with the recording of binary information on a layer of EuO using a laser beam whose output frequency is compatible with the absorption characteristics of the EuO.

An application entitled "Beam Addressable Memory System" by George J. Fan and C. Denis Mee, Ser. No. 563,823, filed July 8, 1966, now U.S. Pat. No. 3,505,658, relates to a scanning system wherein a memory cell of the type shown and described in Ser. No. 563,553 can be used.

BACKGROUND OF THE INVENTION

A hologram is produced by illumination an object or specimen with coherent light, that is, a monochromatic light supplied from a single source of small dimensions. Such specimen-illuminating beam, after being diffracted by the specimen, constitutes an information-carrying beam. The same source of monochromatic light is made to traverse a path which does not impinge upon the specimen, and such path provides a background beam. When such information-carrying beam is allowed to interfere with the background beam before being focused on a recording medium, the latter contains an interference pattern that is unintelligible and does not look like the specimen being recorded. The pattern, however, is a true Fourier-transform of the specimen and consists of straight spectral lines arranged in a grid pattern which is unique to the recorded specimen. When a monochromatic light beam is directed through the recording medium, a reproduction in space of the original specimen occurs.

A detailed discussion of the recording and reconstruction of holographic images appears in U.S. Pat. No. 2,770,166 to Dennis Gabor which issued on Nov. 13, 1956. However, the recording medium for the holograms of such patent is a photographic emulsion on film. Once the holographic image is made, the record is fixed. One cannot change this record, but must make another hologram, on another emulsion, if the first image is no longer desired.

In memories that are to be addressed by a beam of radiation, for example, U.S. Pat. No. 3,164,816 to Chang et al. which issued on Jan. 5, 1965, it is highly desirable to be able to erase the information stored in such memory. The memory unit is maintained in a refrigerator and it is desirable to be able to update the information in such a memory without having to make a new unit and substitute the updated memory for the old memory.

Consequently it would be highly desirable to provide holograms as record media that are erasable. The record medium would have the advantages of a hologram yet be capable of being updated.

One material available in the prior art for making erasable holograms are the photochromics. These are nonmagnetic materials that are energized by ultraviolet light. Such nonmagnetic holograms are intensity holograms wherein the reading out of such records consists in capturing light and dark spots corresponding to constructive and destructive interference within the hologram.

Most known photochromic holograms degrade with use so that after many exposures to recording energy, the photochromic material does not erase its previous information in response to ultraviolet light.

The present invention relies on using a thermomagnetic material as the record medium of which to make a hologram. Examples of a thermomagnetic material are the europium chalcogenides EuO, EuS and EuSe. Each of these materials can have a change in index of refraction occur as a result of changes in magnetization in the material. These changes in magnetization can be induced by changes in light intensity. The recorded medium, when, for example, EuO is used, records differences in phase of wave fronts of a light source and reconstruction consists in capturing the phase retardation of different regions of the hologram. Such reconstruction of the hologram can be obtained using principles of magnetooptics.

Such thermomagnetic materials have been found to have indefinite life as a recording medium. Thus, they are not only erasable, making them highly desirable as a memory unit in a large capacity memory, but the fact that they retain the storage capabilities after repeated exposure to activating radiant energy makes them more suitable than photochromics. Furthermore, the frequency of light given off by a ruby laser is the frequency at which the europium chalcogenides absorb energy very efficiently, thus simplifying the energy requirements for making holograms.

It is an object of this invention to provide an improved means for obtaining holograms.

Yet an another object is to provide a hologram that is capable of being recorded thermomagnetically.

A further object is to make an erasable hologram that requires, for practical purposes, almost negligible developing times.

The foregoing and other objects, features and advantages of the invention will be apparent from the following more particular description of a preferred embodiment of the invention, as illustrated in the accompanying drawings.

Figure 1:
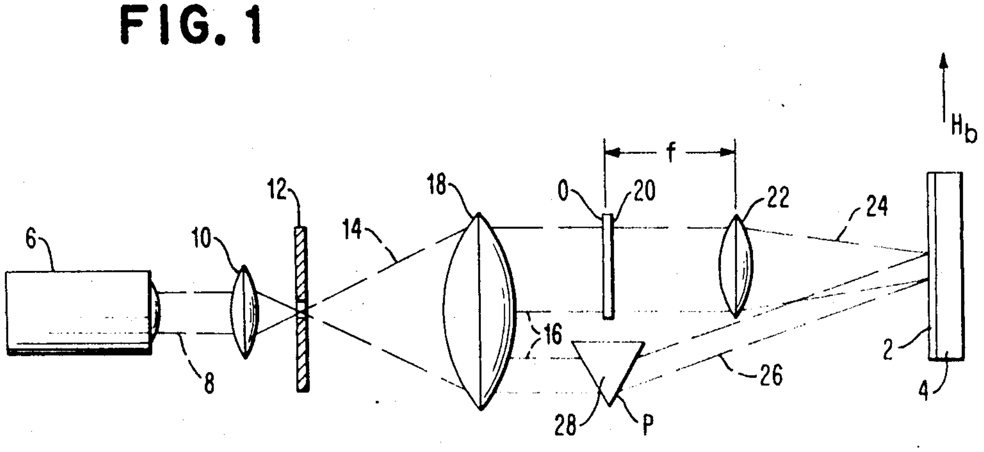
FIG. 1. is an embodiment of the invention showing the manner in which a hologram is recorded.

In order to make a hologram using thermomagnetic writing, a thin film of a europium chalcogenide 2 is deposited on a quartz substrate 4 or other suitable nonmagnetic substrate. The deposited EuO varies in thickness between 1,000–4,000 A. and is laid down onto the quartz substrate by conventional vapor deposition techniques. Electron diffraction analysis showed that such films are composed of small particles of EuO of ~ 200 A. in diameter.

A laser source 6 is chosen so that its frequency and energy output is sufficient to switch the magnetic state of the EuO film. The energy required to write on a EuO film is between $10^3$ to $10^4$ ergs/cm.$^2$ and the energy should be available for a period that is less than 100 nanoseconds. The laser 6 is a Q-switched ruby laser whose instantaneous power is in excess of $10_5$ watts and its pulse width is of the order of 20 nanoseconds. An example of such a laser is given in an article by P.P. Sorokin et al. entitled "Ruby Laser Q-switching Elements Using Phthalocyanine Molecules in Solution" which appeared on pp. 182–184 of the "IBM Journal of Research and Development," Apr. 1964. Vol. 8, No. 2. Such a laser is additionally shown and described in an application by P.P. Sorokin, Ser. No. 350,397, filed Mar. 9, 1964, now U.S. Pat. No. 3,493,885, entitled "Giant Pulse Laser" and assigned to the assignee of this application. While the above description of the holographic writing is given in terms of a parallel writing method, it is clear that the hologram of this invention can also be written using a point by point base. In this case, the hologram of the specimen is apriori computed and the intensity of each spot quantized. Then information can be stored on the EuO either using a laser beam, or an electron beam as a writing transducer.

The laser beam 8 is focused by lens 10 onto pinhole 12 so as to provide only a single transverse mode for the recording process. The exiting beam 14 of laser light is converted to a parallel beam 16 by lens 18. The object 20 to be recorded could be a series of transparent and nontransparent dots, holes, slits, etc., representing binary information. The light that passes through object 20 is focused by lens 22 onto the europium oxide surface 2. At the surface, the image-bearing beam 24 combines with the reference beam 26 that is focused onto the recording surface by prism 28 to form a diffraction pattern of object 20 upon surface 2. The distance between the object 20 and focusing lens 22 is one focal length , causing the object 20 to be imaged at infinity. The hologram recorded on the EuO film is in the nature of a magnetized diffraction pattern.

Figure 2:
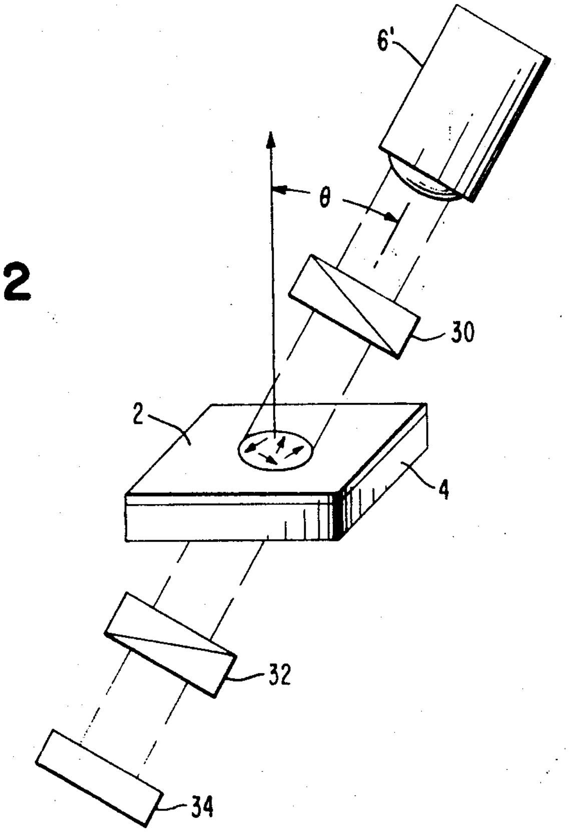
FIG. 2. is a conventional way for reading the hologram made in the manner shown in FIG. 1.
Figure 3:
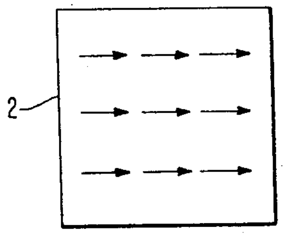
FIG. 3. is a showing of the thermomagnetic-recording element in an erased state.
Figure 4:
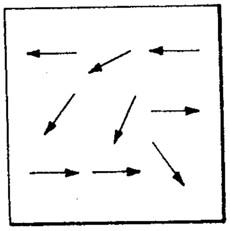
FIG. 4. is a showing of the thermomagnetic-recording element in a stored state.
Figure 6:
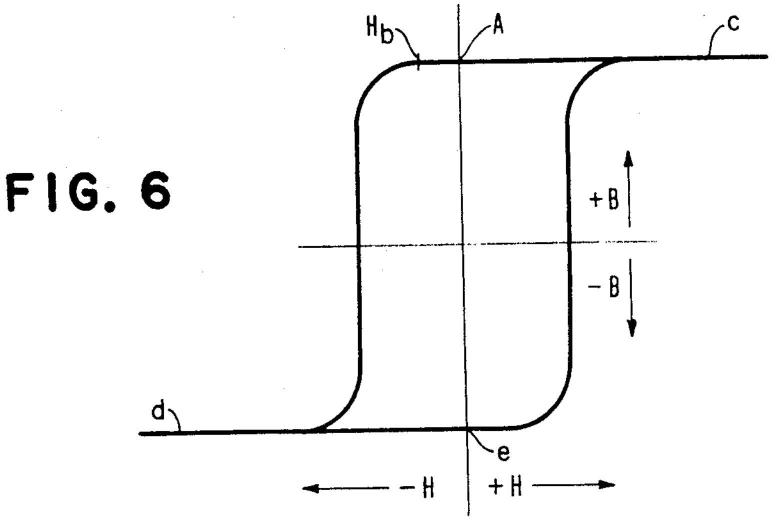
FIG. 6. is a hysteresis plot of europium oxide.

The steps involved in "thermal" writing can be better understood by looking at FIGS. 2–4 in conjunction with FIG. 1. Initially the EuO film 2 is magnetized as shown in FIG. 3 so that all its magnetization is oriented in the one direction shown by the arrows. This is accomplished by applying a magnetic field +H of sufficient strength to drive all the magnetization to saturation state C, and when the magnetic field is removed, the magnetization returns to the remanent state A. The operating point of EuO is chosen where the loop of FIG. 6 is quite square. Such an operating point is approximately 20° K. Prior to writing new information into the EuO film 2, a bias field having the value $-H_b$ is applied to such film, such bias being less than the critical field $-H_c$ and thus insufficient to switch the magnetization. However, when the laser source 6 is actuated during the writing cycle, the object 20 (assuming it contains binary information so that a stored "1" is transparent to laser light 16 and a stored "0" is opaque to such light) will cause a hologram to be recorded thermomagnetically on film 2.

Figure 5:
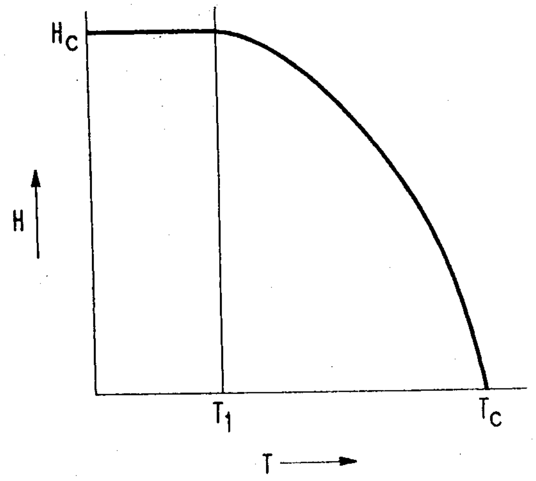
FIG. 5. is a plot of $H_c$ as a function of Curie temperature for europium oxide.

As seen in FIG. 5, the coercive force $H_c$ is a function of temperature. At 70° K, the Curie temperature of EuO, the spontaneous magnetization disappears, or is sufficiently lowered so that $-H_b$ is effective to reverse the magnetization in the heated areas. After removal of the laser pulse and bias $-H_b$, the hologram so produced is the result of an interaction between the information-bearing beam 24 and reference beam 26.

In a conventional hologram recorded on a photographic emulsion, the recorded image maps the intensity pattern. In a similar manner, the EuO film changes its magnetization to conform to the intensity pattern. So, as seen in FIG. 4, the magnetization of the film represents the intensity pattern of the hologram, and like any hologram, partial damage to the film will not prevent reconstruction of the original object 20.

The ruby laser 6, or its equivalent, is chosen because it provides energy in a time that is short compared with the thermorelaxation time of the EuO, the latter being ~ 100 nanoseconds. Furthermore, the hologram formed is based on the fact that the index of refraction of the EuO film is a function of its magnetization. different states of magnetization induced by the laser pulse acts as a phase-hologram for polarized light. Since the index of refraction of magnetic material is split by magnetization, the magnetic profile of the hologram is reconstructed by sensing these index of refraction changes.

Since the magnetic states of the EuO film 2 conforms to the intensity pattern of the hologram, the latter can be reconstructed by observing the magnetization pattern of film 2. The magnetic pattern can be observed by any suitable means that senses a magnetization pattern. One example chosen to illustrate, yet not limit, the ways of making such observation is the use of a magneto-optical read scheme. The longitudinal Faraday effect and the longitudinal Kerr effect are two examples of a magneto-optical method. The magnetic pattern on the EuO film 2 can, for reading purposes, be reconstructed by using the longitudinal Faraday effect rather than determining the phase delay introduced by the circular birefringence of the magnetization pattern on the film 2.

FIG. 2 schematically shows how the thermomagnetically recorded hologram is reconstructed using the longitudinal Faraday effect. A laser source 6′ (or the same laser source 6 with an optical system) is made to impinge at an angle $\theta$ to the normal EuO film 2. The polarizer 30, in conjunction with analyzer 32, gives an intensity pattern at location 34, which intensity pattern is proportional to the magnetization on the EuO film 2. Location 34 could be a camera, an eyepiece or any suitable light sensitive detector.

It is understood that the hologram 30 need not be a pictorial representation of binary data. The object 20 that is stored could be any object through which laser light can be transmitted to form an information-bearing beam capable of forming an interference pattern with a reference beam.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A means for attaining an erasable hologram comprising a storage medium composed of a thermomagnetic film of EuO on a nonmagnetic substrate,
   - means for applying a magnetic field to magnetize said film in a first direction,
   - a magnetic bias means applied to said film tending, but insufficient, to reverse such magnetization, and
   - means for applying a coherent beam of radiant energy through a data-bearing transparency to said EuO film simultaneously with applying said coherent beam as a reference beam onto said film, whereby said radiant energy is effective to switch the magnetization of said film in directions that are related to the intensity of said radiant energy and, in combination with said reference beam, record a phase hologram of said data-bearing transparency onto said film, said beam of radiant energy activating said thermomagnetic film for a time that is much less than the thermal relaxation time of said thermomagnetic film.

2. The device of claim 1 wherein said coherent beam of radiant energy is in excess of $10^5$ watts.

3. The erasable hologram of claim 1 wherein the nonmagnetic substrate is quartz.

* * * * *